Dec. 9, 1930. J. W. HUGHES 1,784,445
APPARATUS FOR AND METHOD OF FABRICATING WHEELS
Filed June 3, 1925 11 Sheets-Sheet 1
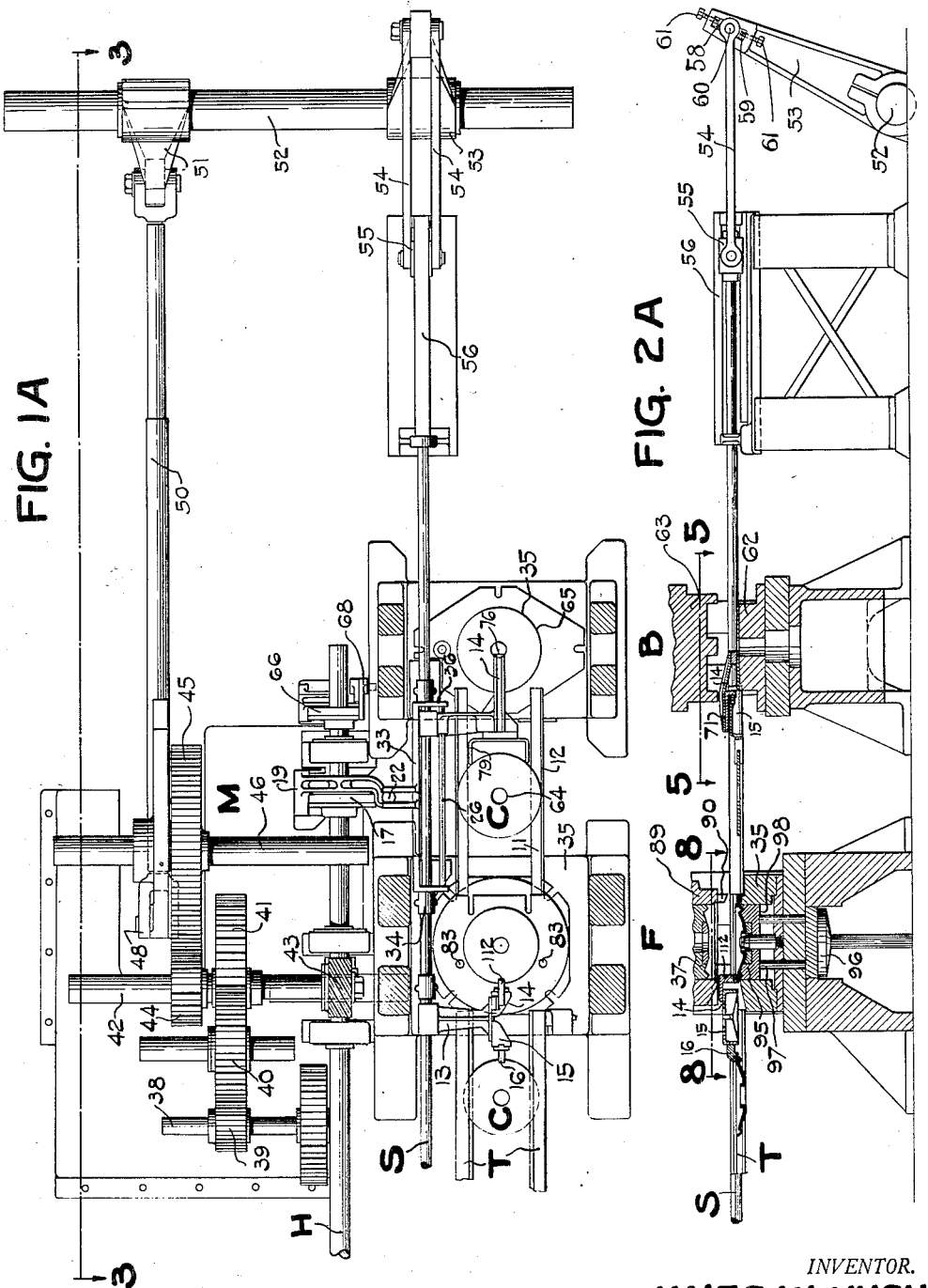
INVENTOR.
JAMES W. HUGHES
BY John P. Tarbox
ATTORNEY.

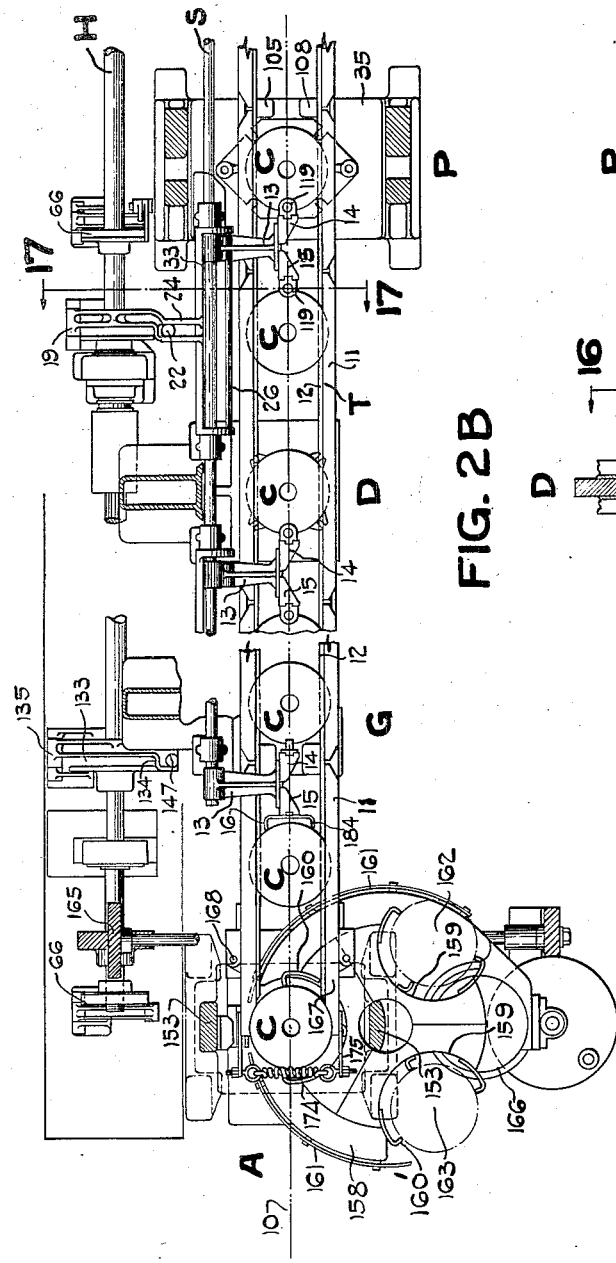

Dec. 9, 1930. J. W. HUGHES 1,784,445
APPARATUS FOR AND METHOD OF FABRICATING WHEELS
Filed June 3, 1925 11 Sheets-Sheet 3
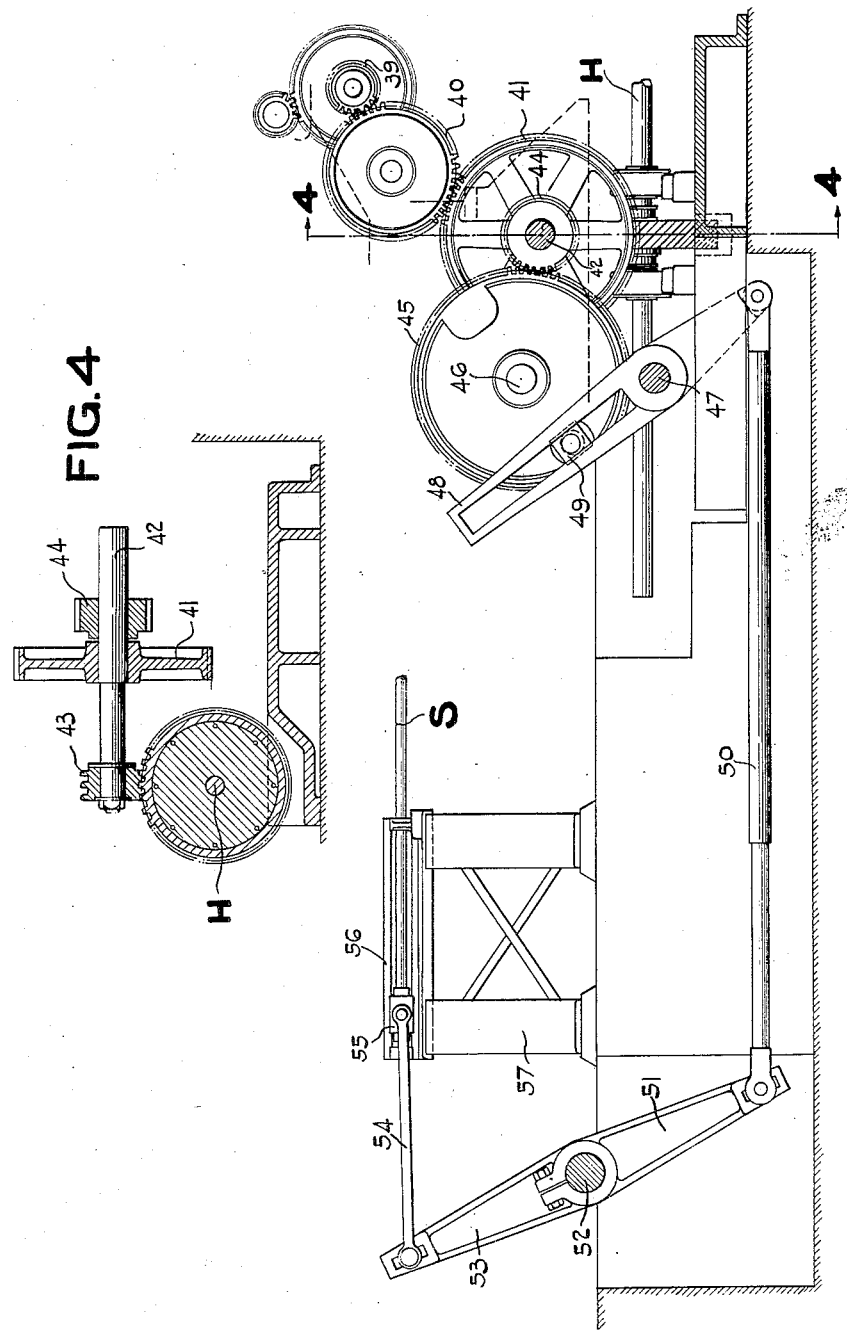
INVENTOR.
JAMES W. HUGHES
BY John P Farbox
ATTORNEY.

Dec. 9, 1930.  J. W. HUGHES  1,784,445
APPARATUS FOR AND METHOD OF FABRICATING WHEELS
Filed June 3, 1925   11 Sheets-Sheet 4
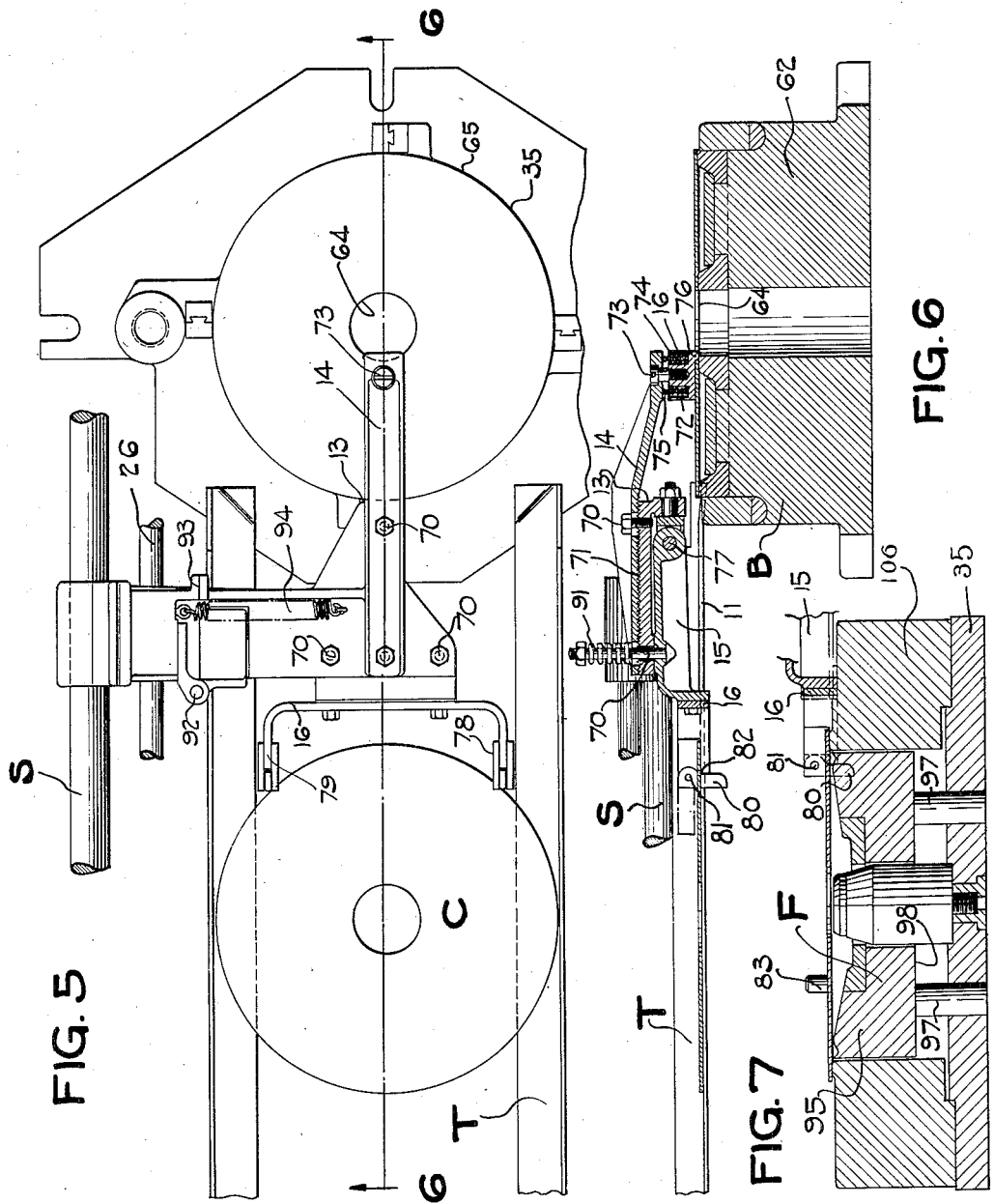
INVENTOR.
JAMES W. HUGHES
BY *John P. Tarbox*
ATTORNEY.

Dec. 9, 1930.  J. W. HUGHES  1,784,445
APPARATUS FOR AND METHOD OF FABRICATING WHEELS
Filed June 3, 1925  11 Sheets-Sheet 5

*INVENTOR.*
JAMES W. HUGHES
BY
*John P. Yarbox*
*ATTORNEY.*

Dec. 9, 1930. J. W. HUGHES 1,784,445
APPARATUS FOR AND METHOD OF FABRICATING WHEELS
Filed June 3, 1925 11 Sheets-Sheet 6
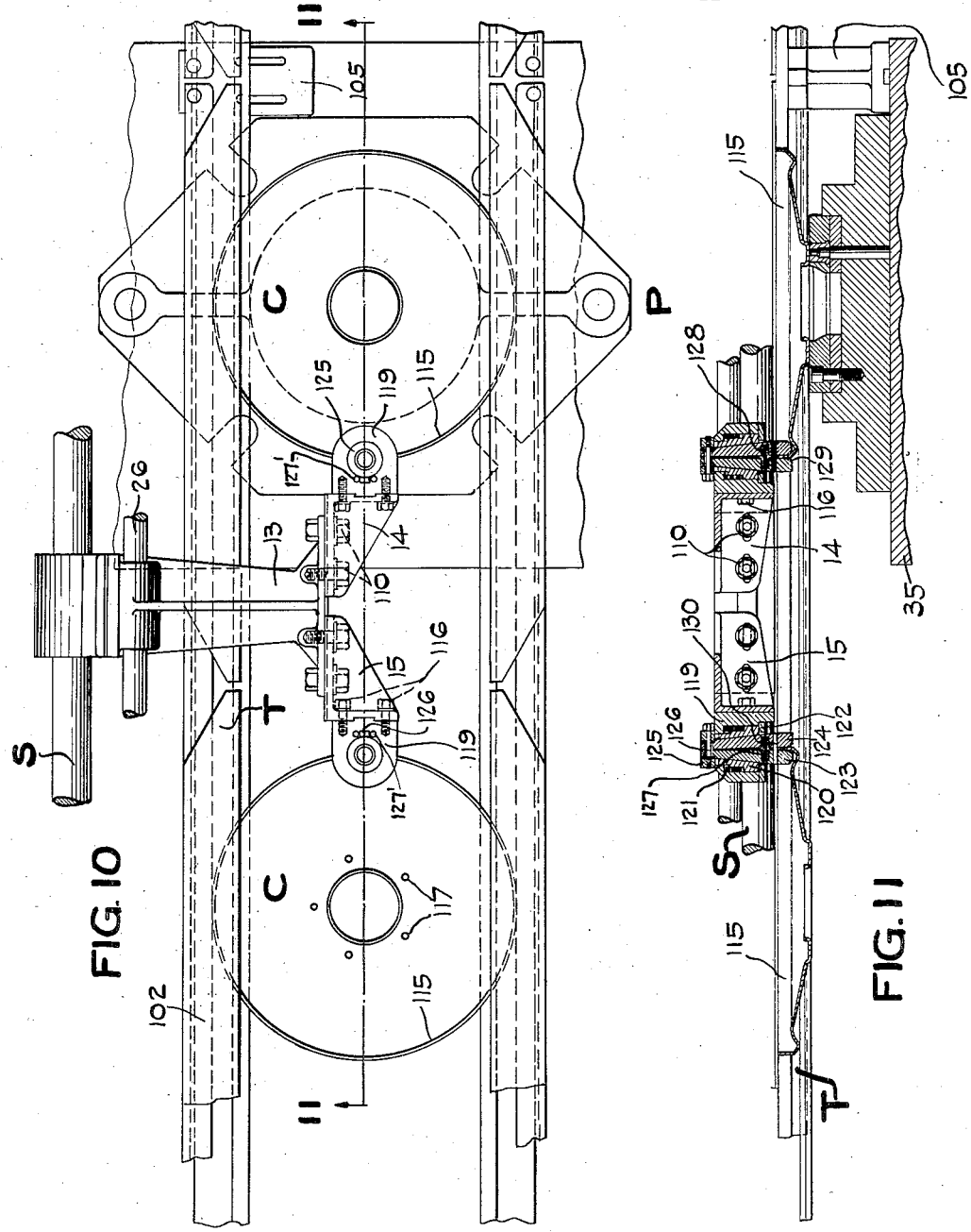
INVENTOR.
JAMES W. HUGHES
BY John P. Farbox
ATTORNEY.

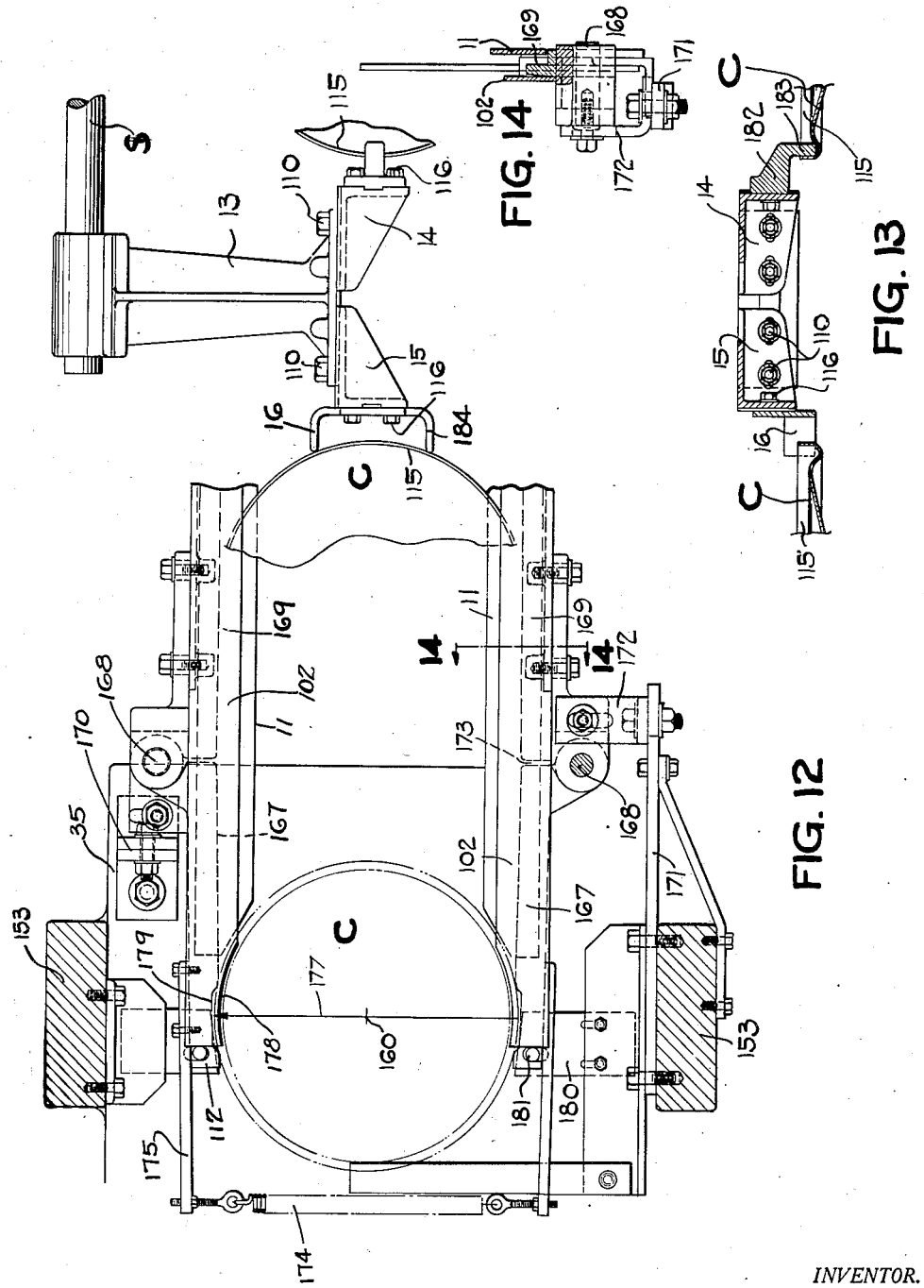

Dec. 9, 1930. J. W. HUGHES 1,784,445
APPARATUS FOR AND METHOD OF FABRICATING WHEELS
Filed June 3, 1925 11 Sheets-Sheet 8

INVENTOR.
JAMES W. HUGHES
BY John P. Fairbox
ATTORNEY.

Dec. 9, 1930.  J. W. HUGHES  1,784,445
APPARATUS FOR AND METHOD OF FABRICATING WHEELS
Filed June 3, 1925   11 Sheets-Sheet 10
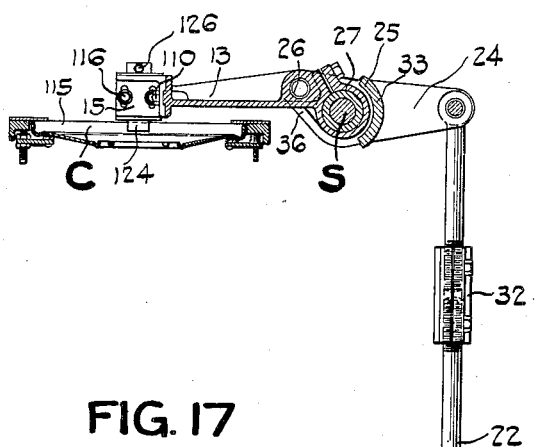
FIG. 17
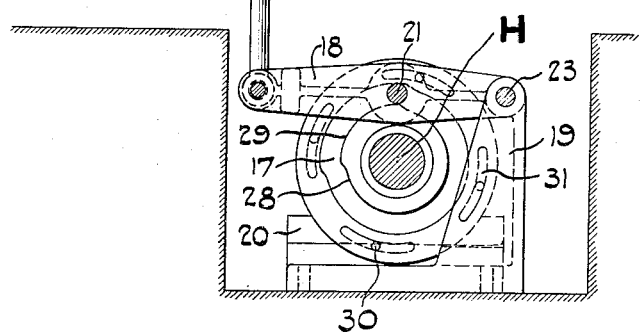
INVENTOR.
JAMES W. HUGHES
ATTORNEY.

INVENTOR.
JAMES W. HUGHES
BY John P. Tarbox
ATTORNEY.

Patented Dec. 9, 1930

1,784,445

UNITED STATES PATENT OFFICE

JAMES WILLIAM HUGHES, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

APPARATUS FOR AND METHOD OF FABRICATING WHEELS

Application filed June 3, 1925. Serial No. 34,743.

My invention relates to method of and apparatus for making wheels, such as wheels of the disc type now in common use throughout the world upon automotive vehicles. While of this especial relation, however, it will be apparent upon an understanding of my invention that it is possessed of utilities not necessarily limiting its field to that of disc wheels. For example, certain of its features may be found of use in connection with the manufacture of other types of wheels or in connection with the manufacture of articles of a nature other than wheels such that the method and apparatus of my invention may be applied to their manufacture.

The outstanding and principal object of my invention is to affect automatically substantially the entire process of manufacture of a wheel, in the case of a disc wheel, its automatic fabrication from a previously manufactured flat blank adapted to form the disc and a previously manufactured rim. The use of the method of my invention is a prime factor in the attainment of this object. The apparatus by means of which it is carried out is scarcely less a factor. So far as I am aware, the substantially entire automatic manufacture of vehicle wheels of this class or any other has never heretofore been attained. Automatic operations were performed on the various parts of the wheel, it is true, but in each case the operations were performed independently of each other, requiring an amount of manual labor representing a very high percentage of the total cost of production. According to my invention, the wheel parts, as the disc blanks and the rims are fed to the apparatus of my invention at appropriate locations in the train of mechanisms and require no manual labor from the time they are fed to the mechanism until the time the completed wheel is delivered therefrom.

Subordinate objects of my invention relate to the co-ordination of the numerous mechanisms which make up the apparatus as a whole, and the apparatus as a whole is so extensive that they will be the better understood upon an understanding of the apparatus as a whole and its operation. So, too, will the method of my invention be more readily comprehended upon a complete understanding of the apparatus portion of the invention. It will be succinctly stated after this apparatus is described, and its operation set forth.

The drawings illustrate one embodiment of my invention. Of them—

Figures 1—A and 1—B together are a plan view of the apparatus of my invention with certain portions broken away and others in horizontal section for the purpose of simplifying and clarifying the showing.

Figures 2—A and 2—B are corresponding sectional elevations of the same portions of the apparatus taken approximately in the longitudinal vertical plane of the apparatus.

Figure 3 is an elevation of a portion of the drive mechanism taken on line 3—3 of Figure 1—A looking in the direction of the arrows.

Figure 4 is a transverse section of a portion of the driving mechanism taken on line 4—4 of Figure 3 looking in the direction of the arrows.

Figure 5 is an enlarged plan view of a portion of the fore part of the apparatus embodying a blanking press and a fore part of the conveyor mechanism by means of which the blanks are conveyed from the blanking press to a forming press next in order, the view being taken substantially on line 5—5 of Figure 2—A.

Figure 6 is a longitudinal central section of this portion of the apparatus taken substantially on the center line designated 6—6 of Figure 5.

Figure 7 is an enlarged longitudinal vertical section of the bed of the forming press showing the relation of this bed to that portion of the conveying mechanism shown in Figure 5.

Figure 10 is a plan like Figures 5 and 8 taken substantially on line 10—10 of Figure 2—B, showing the bed of a punching press and an associated portion of the conveying mechanism.

Figure 11 is the corresponding longitudinal vertical section of the portion of the apparatus shown in Figure 10 taken substantially on the line 11—11 of Fig. 10.

Figure 12 is likewise a plan view taken substantially on line 12—12 of Figure 2—B, enlarging that portion of the apparatus near its rear end and showing in plan the bed of an assembly machine by means of which the rims and the discs are assembled together, and the associated portion of the conveying mechanism.

Figure 13 is a longitudinal, vertical section of the carrier part of this portion of this conveying mechanism of Fig. 12.

Figure 14 is a section taken substantially on line 14—14 of Figure 12.

Figure 17 is a transverse sectional elevation taken substantially on line 17—17 of Figure 1—B showing the device used to actuate the carriers of the conveyor mechanism to take hold of and release the parts being conveyed.

Figure 8:
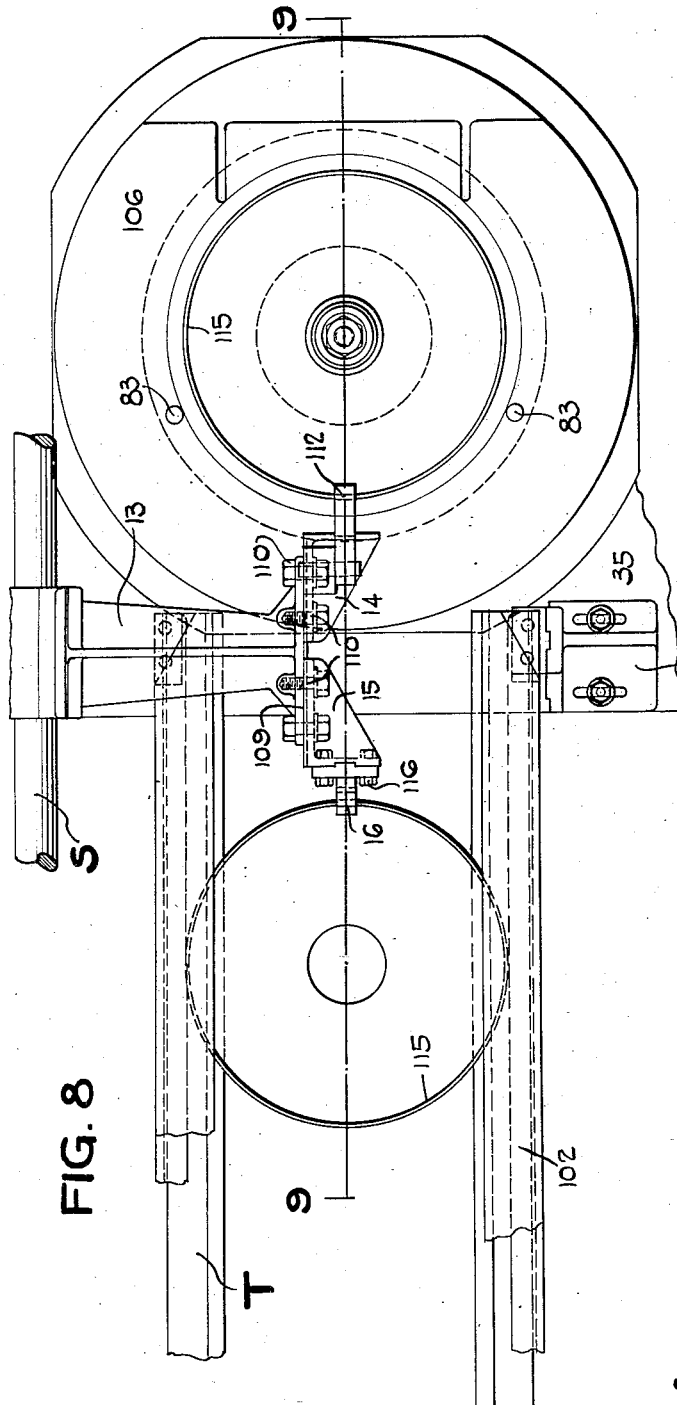
Figure 8 is a plan view similar to the plan view of Fig. 5 showing the bed of the forming press to which the blanks are conveyed from the blanking press, and that portion of the conveying mechanism associated therewith, the view being taken approximately on line 8—8 of Figure 2—A.

So far as has been practicable, I have used in embodying the apparatus of my invention well-known machines of standard character and modified these machines wherever necessary to secure their coaction with each other and with those portions of the apparatus which it has not been found possible to embody in standard machines. These modifications are so numerous that the standard machine may not be readily understood from a preliminary survey of the drawings. These machines include a blanking press B (Figures 1—A, 1—B and 2—A, 2—B) by means of which the blank which is to form the disc is cut at at the center and at its periphery concentrically and approximately to the contour the finished disc is to have; a forming press F by means of which the disc blank is given the axial curved section it is intended to have as for example, a conical section with hub and rim mounting flanges and the like; a punching press P by means of which the annular series of centrally located holes is punched to receive the bolts by means of which the wheel is to be secured to the hub; a drilling machine D by means of which the punched holes are drilled or reamed to more accurate size than their punching size; a coining press (not shown) by means of which the borders of the punched and drilled holes are given that contouring enabling them best to coact with the securing means, as for example, a conical or spherical nut such as used in connection with the Michelin wheel; a coin facing machine (not shown) by means of which the coined borders of the wheels have their inwardly projecting faces of desired dimension whereby undue interference with the hub securement and irregularities of edge are removed; a center flange facing machine (not shown) by means of which the center flange is faced accurately to that dimension that will give proper bearing upon the hub flange; a center flange finishing machine (not shown) by means of which the flange is finished the more accurately to dimension, and an assembly press A by means of which the discs so manufactured are assembled with the rims. These machines as modified according to my invention and supplemented by the remaining apparatus are arranged substantially in a rectilinear series extending from right to left commencing with the blanking press B and ending with the assembly press A. Those machines not indicated in the figures of the drawings but mentioned herein are omitted for the sake of brevity and clearness, and it is to be understood are to be arranged and coordinated with the remaining portions of the apparatus at large in the same manner as those machines which have been so shown. For example, the coining press is arranged and operated and coordinated in a manner entirely similar to the punching press P, and the several facing machines are arranged and coordinated in a manner entirely similar to the operation and coordination of the drilling machine D. Extending from machine to machine throughout the series is a double track-way T of a disc conveying mechanism. Paralleling this track in the rear and passing through the bodies of the several machines which it interconnects is a conveyor shaft S having a combined reciprocatory and oscillatory movement through which it actuates a series of carriers of different character by means of which the discs C, shown in various locations along the track-way are carried from position to position and from machine to machine in the process of manufacture. Also paralleling the line of machines is a control shaft H through the rotation of which the several machines of the apparatus are controlled. Arranged to commonly drive both the conveyor shaft S and the control shaft H is a driving mechanism M. The several machines through which the manufacture is effected may be independently or collectively supplied with power as the requirements of their operations make necessary and such driving means, forming no part of my invention, is not here shown.

The track-way T of the conveyor mechanism is arranged symmetrically with respect to the longitudinal center line 10 of the group of machines, whereby the discs being fabricated are always, when in position, in axial coincidence with the vertical axis of a given machine. The rails in different operations of the track-way are of different cross section but they possess in common a horizontally extending bottom flange 11 and a vertically extending body web 12. These vertically extending body webs are always spaced apart a distance equal to the diameter of the disc as it passes from the immediately preceding machine which has operated upon it, thus maintaining the discs with their centers always opposite the longitudinal center line 10. The shaft S which has the combined reciprocatory and oscillatory movement is provided with a series of conveyor arms 13, one arm located between each successive pair of machines of the line. The arms 13 are respectively each provided with two forearms 14 and 15, and at the ends of each of these arms are secured carriers in the form of fingers designated generally 16 and adapted to contact with or grasp as occasion may require the border of the disc being manufactured in the downward movement of the arms 13 during oscillation of the shaft S, to move the discs collectively along the track-way a certain distance equal to the length of the reciprocation of the shaft S, and upon the oscillation upwardly of the arms 13 to release the discs so moved and permit them to remain in the position to which they have been moved. It will be observed that there are twice as many discs positioned along the track-way as there are machines which operate upon them. Every other disc of the series is positioned in a machine to be operated upon. The alternate ones are positioned midway between the machines which operate upon them. The vertical center lines of the several machines are uniformly spaced apart, and the length of the reciprocatory stroke is so regulated that it is equal precisely to one half of the length of the uniform space between the centers of the machines. Thereby the alternate discs are located precisely in the middle of the space between the adjacent machines in each case. The span of the forearms 14 and 15 is measured by the distance between the point of grasp or contact of one finger 16 and the other finger 16 and is equal to the length of stroke of the shaft S which is to say, one half of the distance between adjacent machines of the line minus the then diameter of the disc being operated upon. Thereby the process of conveying is carried out as follows: The hind-most carrier 16 of the given arm 13 engages and grasps the border (with certain exception presently to be noted) of a disc positioned in a machine while the foremost carrier 16 associated with the same arm 13 engages or grasps the near border of the disc in advance and located intermediately of that machine and the next succeeding of the line. At the end of the stroke, the disc in the machine has been moved to a position intermediate the machine and the next succeeding one while the disc in advance of the machine has been moved into operating position in the next succeeding machine. This process of conveying simultaneously twice as many discs as are operated upon at one and the same time, and this dual engagement or grasp upon the adjoining borders, avoids the projection of any part of the conveyor mechanism within the vertically extending paths of movement of the operating parts of the machines, and effectually prevents any interference whatever between the conveyor mechanism and the operating parts in these paths or in their locations. The forearms 14 and 15 and their carriers 16 are thereby (with a few exceptions to be noted) always entirely outside of the bodies of the discs being manufactured.

The oscillatory movement of conveyor shaft S is imparted to it through the arms 13 which in turn are oscillated by the mechanism shown in detail in Figure 17. This mechanism is driven from the control shaft H of the apparatus and comprises a radial grooved cam 17 on the shaft, a cam lever 18 pivoted on a pedestal 19 connected with the bearings 20 of the shaft, a cam follower 21 on the lever, a link 22 connected with the opposite end of the cam lever 18 from the pivot 23, and a forked lever 24 connected with the link and driving a quill 25 journaled on the shaft S and driving the arm 13 by means of an offset quill shaft 26. The arm 13 is clamped to the shaft S by the split sleeve 27 and consequently when the cam 17 on the control shaft H oscillates quill 25 also oscillates the shaft S. The cam 17 is provided with an extended arm lifting face 28 which when engaged by the follower 21 holds the arm 13 lifted for the major portion of a single revolution of the shaft H and a lowering face of considerable less extent whereby it holds the arm 13 in lowered engaging or grasping position as shown in Fig. 17 for the minor portion of a single revolution of the shaft H. The major portion represents the period of the return stroke of shaft S during which time the lifted arms 13 release the carriers 16 from their engagement with the discs being conveyed. The extent of the minor portion 29 represents the comparative period of the forward stroke of the shaft S during which the arms 13 are lowered and the carriers 16 engage and convey the discs.

Cam 17 is adjustable upon a cam hub as indicated by bolts 30 passing into the hub through slots 31 in the body of the cam. The length of the link 22 is also adjustable by means of the split threaded coupling 32 having right and left hand thread connections with the opposite end portions of the link 22.

Quill 25 is in the form of an elongated body 33 arc shaped in cross section concentric with the axis of shaft S and journaled at its opposite ends as has been said upon shaft S. This provides a free space between body 33 and the sleeve 27 of the arm 13 fixed to the shaft. The ends of the journals bear respectively against the fixed bearings 34 by means of which the shaft S is borne from the beds 35 of the several machines. The quills 25 are thus prevented from longitudinal movement in the reciprocation of shaft S and can partake only of that oscillatory movement imparted to them by cams 17 and through arms 18. The shaft 26 passes through frontal extensions 36 from the opposite ends of the quill. The shaft 26 passing through the arm 13 constitutes a most effective means of splining the arm and the shaft S to the longitudinally fixed quill, a means not subject to any of the short-comings of a key spline which must necessarily be located close to the axis of shaft S and upon relatively heavy loads imposed upon the conveyor during oscillation is subject not only to undue friction which might cause jamming of parts and to undue forces which might cause breakage of parts, but also to undue wear and to a multiplying of those inaccuracies brought about by undue wear and variations from desired dimensions. For not only is shaft 26 of more generous proportions than it would be practicable to make the large spline, thereby furnishing an extended bearing for arm 13 upon its surface, but also it is radially removed from the axis of shaft S several times the distance that the usual spline would be removed whereby the leverage is multiplied and the pressure upon the bearing surface greatly decreased.

The several cams 17, located as has been intimated, one between each pair of adjacent machines are timed to oscillate connected quills in unison. They thereby exert in unison through arms 13 oscillating torques upon the shaft S, and divide up between themselves uniformly with proper adjustment the total torque required to oscillate shaft S and the connected arms 13 and their appurtenances. Since there is applied to each section of shaft S a portion of the total torque required, shaft S is not twisted in its length, but retains its form and accurately positions all of the arms 13 connected with it.

Figure 22:
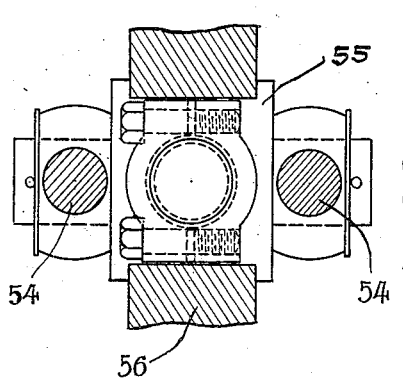
Figs. 22 and 23 are respectively a vertical transverse sectional view and a vertical longitudinal sectional view of the cross head through which the conveyor shaft is reciprocated and the guide therefor.
Figure 23:
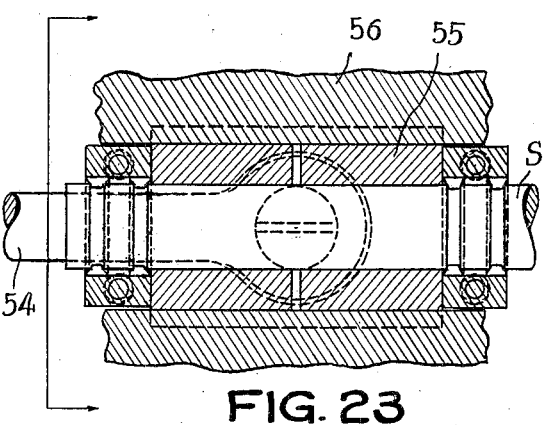

The reciprocatory movement of shaft S is derived from the mechanism M. This mechanism as well as the control shaft H is driven from the forming press F which is constituted according to my method the master press or master machine of the apparatus. One and the same motor is used to drive this master machine F, the control shaft H and the conveyor mechanism, merely by providing in the motor sufficient power to perform all of these duties rather than the one duty of forming. This motor is not shown since the motor per se does not constitute a part of my invention, nor the connections by which it drives the upper die 37 of the forming press. The shaft 38, however, is one of the shafts connected with the forming press and which is continuously driven by this motor. When so driven this shaft 38 continuously actuates the forming press to perform its manufacturing operation at regular periods. The press does not therefore require a trip and none is shown. Shaft 38 carries a pinion 39 meshing with an intermediate gear 40 which in turn through gear 41 and shaft 42 drives a worm gear 43 which rotates the shaft H continuously. Shaft 42 also carries a gear 44 meshing with the very large gear 45 on stub shaft 46. Immediately below stub shaft 46 is a second shaft 47 upon which is keyed a link 48 of a quick forward and slow return movement and the sliding block 49 cooperating with said link is pinned to the face of the gear 45. The lower end of link 48 is connected by a rod 50 with the lever 51 which depends from a transverse shaft 52 located in advance of the machines of the line. This shaft is provided with an upwardly extending lever 53 connected by pitman 54 with a cross head 55 mounted for reciprocation in the cross head guide 56 carried by pedestal base 57 substantially at the level of the axis of shaft S. Shaft S passes through the cross head guide and is swivelly connected to cross head 55 as shown clearly in Figs. 22 and 23 whereby its oscillatory movement described takes place unhampered by its connection with cross head 55. The rotation of the gears results in the fast and slow movement of the link 48 of the scotch motion, and a fast forward and slow return reciprocation of the shaft S. Such a movement insures a rapid conveyance of the discs from one position to another, and a relatively slow return movement of sufficient duration to permit completion of the operations performed by the several machines.

Bearings are, of course, provided for the several shafts and gears which are shown in Figs. 1—A and 3, but they need not be shown in detail. An adjustment is provided at the top and bottom of lever 51 whereby the connections of pitman 54 and rod 50, respectively, with the levers 53 and 51 may be readily adjustable to vary slightly the length of stroke of shaft S with a resultant fine adjustment of the positions of the discs as a group as established by the arms 13. This adjustment is shown in detail in Fig. 2—A and comprises a sliding block 58 moving in a slot 59 in the end of the lever, connected by a pin 60 with the pitman or rod, as the case may be, and adjustable and retained in its adjusted position by the upper and lower set screw 61.

Figure 15:
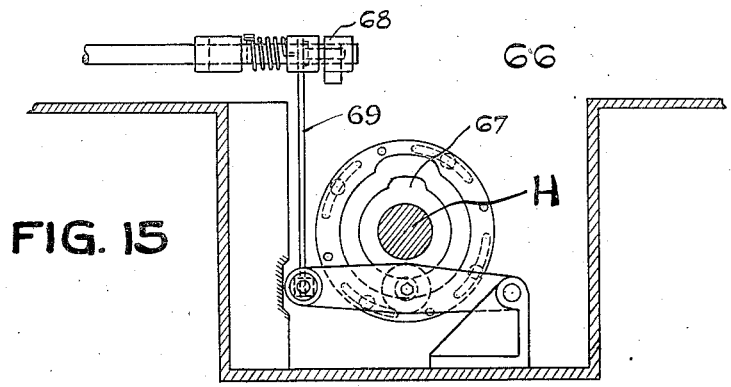
Figure 15 is an enlarged transverse elevation of the trip mechanism used in connection with the several processes of the apparatus.

The blanks from which the discs C are to be formed are fed automatically into or placed by hand upon the lower blanking die 62 of the blanking press B, being centered by suitable stops or by eye as may be preferred. This press when the upper blanking die 63 comes down upon the blank so placed upon the lower die 62, punches the central hole or aperture 64 in the disc and trims its edges to a circle concentric with the aperture. The press is controlled by a trip mechanism 66 shown in detail in Fig. 15 operated from the continuously operated control shaft H. This mechanism is simply a quick acting cam 67 operating upon the trip lever 68 of the press through the intermediary of the train of mechanism 69. The cam gives the lever the pull required and then releases the lever whereupon the press by the usual one revolution and stop type performs its blanking stroke and stops with the upper die 63 in raised position.

The section of the track T between this blanking press B and the master press F is composed of rails of angle cross section presenting inwardly and upwardly extending branches 11 and 12 respectively. The arm 13 of the conveyor mechanism opposite this section has its forearms 14 and 15 formed peculiarly to meet the requirements of conveying the blanked disc. Forearm 14 is adjustably mounted on the arm 13 by means of the bolt and slot connections 70 which clamp together the serrated contiguous faces 71 of the forearm and arm. The carrier 16 at the end of the arm is comprised of a block 72 swivelly connected by the shouldered machine screw 72 with the outer end of the arm. Block 73 carries sockets 74 containing spiral springs 75 which project it from the under face of the forearm 14 to the limit permitted by its swivel connection 73 and permits it to move with a certain degree of freedom about its swivel 73. On its lower rear edge it is provided with an engaging finger 76 which at the end of the return stroke of shaft S is positioned to engage over the edge of the blank central opening 64 of the disc but not to project below the body of the disc. Thereby on the forward stroke of the shaft S, the blank disc C is drawn forwardly across the face of the lower blanking die 62 and into the angle section track-way T. The ends of this trackway are secured to the bed in such manner that the upper surface of the horizontal flange 11 lies below the upper face of the lower die 62 as clearly appears in Fig. 6.

The forward forearm 15 of this section of the conveyor is of different construction. It is transversely pivoted at 77 to the body of arm 13 and carries on its front end a forked carrier 16 the engaging ends of which lie on a circle of the diameter of the blanked disc and having its center on the center line 10, Fig. 1—B of the apparatus. One branch 78 of the forked carrier 16 is provided with a broad rigid end. The other branch 79 is provided with an equally broad but pivotally mounted end 80 in the form of a finger making a knuckle joint 81 opening outwardly and upwardly only, fixed by abutting walls 82 against rearward movement. This carrier, when the shaft S is at the end of its backward stroke, engages by the ends of its branches 78—79 the periphery of a blanked disc in the intermediate position and pushes it along the track-way T into position to be operated upon by the forming press F. This position is clearly shown in Fig. 7 and also appears in Figs. 1—A and 2—A. In addition to being defined by the fore ends of the branch 78—79 at the end of the forward stroke of shaft S, the position is also defined by a pair of pins 83 in the bed 35 of this press, the sides of which are tangent to a circle centered in the axis of the machine and having a radius equal to the radius of the blanked disc. Additionally, the upper die head 89 is provided with a peripherally arranged series of downwardly and outwardly tapering blades 90 the inner edges of which lie on a circle concentric with the axis of the machine. Being arranged in a circle substantially of the diameter of the disc, these pins and blades enter into recesses in the head 89 and bed 35 of the press, respectively, and lie outside of the outer zone of the forming operations.

When the head 89 of the die press is lowered on the forming stroke it may engage the carrier 16. If so, it merely oscillates the carrier slightly downwardly against the tension of spiral springs 91 which bias it to its upper position. This is particularly likely to occur during the upward oscillation of the arm 13 immediately following the end of the forward stroke of shaft S. On the return stroke to the end 80 of branch 79 of carrier 16, by reason of its being close to shaft S, is not raised so as to entirely free the carrier from the disc in the intermediate position across which the return stroke carries it. Being free to move upwardly to the dotted line position shown in Fig. 6 it does move upwardly and passes freely over the disc without displacing the disc from its intermediate position, and after it passes the rear edge of the disc, it drops down and takes up its engaging position behind it as the arm 13 is again lowered at the end of the back stroke of shaft S. In this blanking press section of the conveyor the arm 13 is made in two parts joined together, on the line 93, by the vertically pivoted bolt 92 and biased toward each other by the strong spiral spring 94. Through this means, should there be any interference encountered by the rear forearm 14 due to infringement against a fouled blank or against the upper die, the forearms may swing about the pivot 92 without damaging the apparatus. This merely results in one conveying position being left without a blank until a succeeding stroke of shaft S at which time an attendant may have removed the obstruction.

Figure 9:
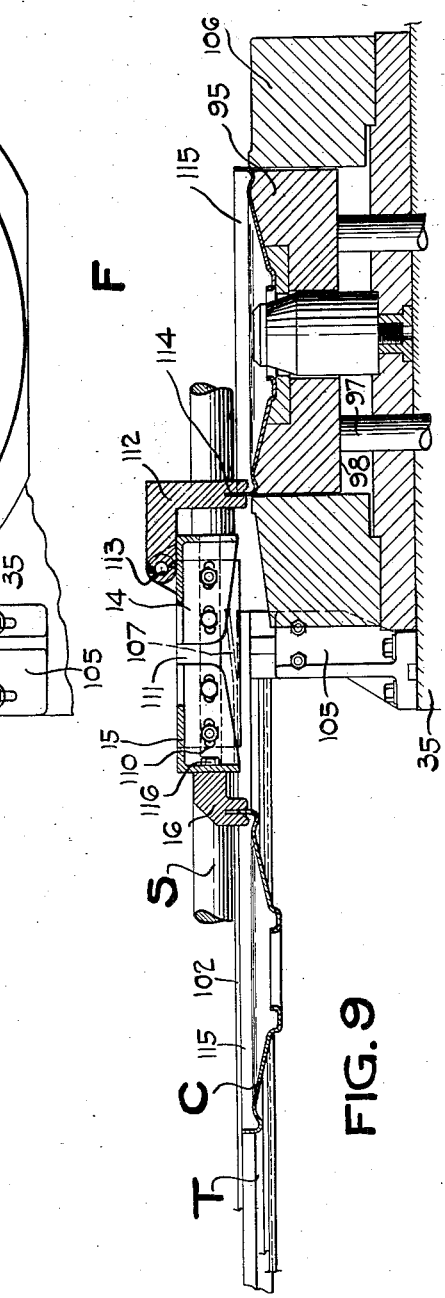
Figure 9 is a corresponding longitudinal vertical section taken substantially on the line 9—9 of Fig. 8.

The forming press F is the most powerful machine of the apparatus of the embodiment which I have illustrated. It performs the major forming operations converting the flat blank disc C into a conically tapering disc as shown clearly in Figs. 8 and 9, provided with a central hub flange and boss and with a peripheral rim flange. These forming operations are carried out by coaction of the upper forming die 89 with a lower die having an axial center body 95. This body is projected downwardly by the upper die against the upward pressure of a plunger 96 with which it connects by rods 97 until the abutment 98 engages the bed and stops such downward movement. This enables the forming operation to be constituted a drawing operation to the extent desired and the rim flange of proper depth to be formed. At the close of this operation as the upper die is withdrawn, the lower die body 95 is projected suddenly upwardly by an application of compressed air to a cylinder beneath the base of the press (not shown). The application of air to this cylinder is governed by the master forming press F through a system of linkages which controls a quick-throw air valve governing the supply of air to this cylinder. This die stripping mechanism itself forms no part of my invention but its timing with respect to the forming operation and the conveying operations, and its control from the master press F itself is a part of the method and apparatus of my invention.

Figure 20:
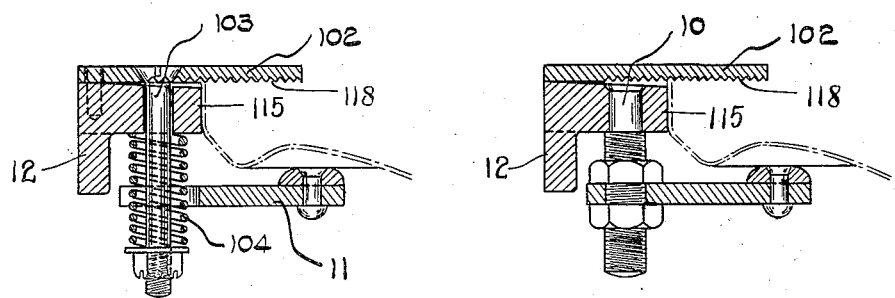
Figures 20 and 21 are representative cross sections of the intermediate portions of the tracks between subsequent machines beyond the master press, one showing the yielding mounting of the lower flange of the upper flange of the track and the other the relatively fixed mounting.
Figure 21:
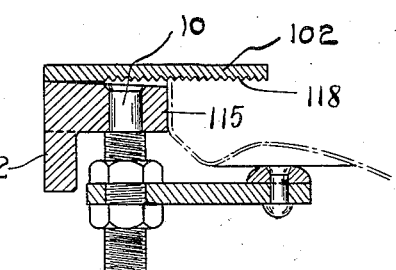

A section of track-way T between the forming press F and the punching press P is of different cross section from that of the section between the machines B and F, of different construction and different mounting (see Figs. 8, 20 and 21). The body of it comprising the flange 11 and the vertical wall 12 is of angle cross section as in the case of the portion between the machines B and F. But the section is heavier, particularly in the body wall 12. Secured to its top yieldingly is a top flange 102 constituting the rails of channel cross section instead of angle cross section. The securement of the top flange 102 is by means of bolts 103 passing through the body 12 and spiral springs 104 each bearing against the bottom of the body and a washer and nut on a bolt 103. The width of each rail is substantially equal to the depth of the rim flange 115 of disc C. The width of the rails may be adjusted by moving the clamping nuts along the bolts 10 supporting flange 11, Fig. 21. The yielding top flange 102 allows for slight differences in height of the rim flanges 115 of different discs. The distance between the bodies 12 of the rails is substantially equal to the diameter of the formed disc, considerably less than the diameter of the blank disc. The ends of the track are supported from the bed 35 of the press by means of pedestals 105 with the upper surface of the lower flange 11 approximately at the level of the upper surface of the outer body 106 of the lower die whereby when the formed disc is stripped from the die and grasped by the carriers 16 of the conveyor mechanism it may be readily drawn into the channel section track-way as shown in Figs. 8 and 9. The entrance end of the track-way is flared by deflecting the end of the upwardly yielding flange as shown in dotted lines at 107 in Fig. 9 whereby easy entrance may be effected. The opposite end of this track-way section between machines F and P is supported by pedestals 105 upon the piercing press.

The conveyor mechanism opposite this section is also peculiarly characterized. The forearms 14 and 15 connected with arm 13 are so connected in a substantially vertically extending plane by meeting serrated surfaces at 109 (like serrations 71, Fig. 6) on the arm 13 and forearms 14 and 15, respectively. Bolts and slots designated together 110 render this connection adjustable, while longitudinally extending splines 111 preserve the alinement. The carrier 16 at the rear end comprises an angle shaped member 112 pivotally mounted by its upper arm on a transverse axis 113 above the forearm 14 and having its lower branch transversely slotted as at 114 to receive the upwardly projecting rim flange 115 of the formed disc. Member 112 is so formed, and adjustable in position so that when arm 13 lowers it into engagement with the rim flange 115 at the end of the back stroke of shaft S, it grasps this rim and on the forward stroke draws the formed disc forwardly and into the flared rear end of the track T. If the disc under the action of the tripping mechanism 96 and 97 has not been loosened from the lower die body 95, it will be instantly loosened through the leverage exerting upon the rim flange 115 by reason of the elevation of the pivot 113 of the carrier above the plane of the formed disc and above the forearm 14, such leverage tending to tilt the body of the formed disc up about its formed edge in the grasp of its carrier and thereby dislodge it from the body 95.

The front carrier 16 is also of angle shape and provided with a slotted lower branch adapted to engage over the rim of a formed disc, is fixed to the fore end of the forearm 15 by bolts 116. For in this instance it does not have to effect a dislodgment of a formed disc from the forming die but merely to engage the rear edge of the rim 115 of a disc in an intermediate position and to shove it along the track T.

The formed disc is shoved by the front carrier 16 of this section of the conveyor from the intermediate position into which it has been drawn by the rear carrier 16 into the piercing position on the axis of the piercing press P. This press carries an annular series of piercing or punching dies the function of which is to punch in the disc the annular series of bolt holes 117. This press like the blanking press B is operated by a trip mechanism 66 to 69 in all respects similar to that shown in Fig. 15 in connection with the blanking press B. It makes one stroke and stops until again operated in the continuing operation of the control shaft H. At the close of this operation the rim flange of the pierced disc is engaged by the section of the conveyor mechanism between the piercing press P and the drilling machine D.

The conveyor mechanism in this section is characterized by features shared in common by the remaining operations of the conveyor mechanism from this point to the point of delivery of the finished work with the single exception of the section adjoining the assembly machine A which will presently be described. These characteristics are shown in the enlarged views of this section of the conveyor of Figs. 10 and 11. The track-way T is of channel cross section and its top flanges 102 are yieldingly mounted as was the case with the preceding section of track. The top flange 102 in addition is built in sections of relatively short length one for each wheel disc positioned whereby they are independently yielding and each disc is independently yieldingly held in position. Moreover, the under faces of the top flanges 102 are longitudinally serrated as shown clearly at 118 in the cross section of Fig. 21 whereby the discs yieldingly held in position by these top flanges 102 are longitudinally guided by the longitudinal movement of the edges of the flange along serrations 118. The trackway T so formed from the forming press on throughout the remaining machines is substantially continuous in this form and is unbroken in its length as in the case of the blanking and forming presses, the track passing over the beds 35 of the machines in elevated position instead of terminating at the beds of the machines. This is for the reason that there are no further operations to be performed upon the peripheral portions of the disc, the remaining operations centering in the central zone of the disc. Support for the bed is by means of the pedestals 105 as heretofore.

The holes 117 having been pierced, it is important that the formed disc be subject to no angular rotation in the track-way in its movement from one position to another. The longitudinal serrations 118 conduce to this end but the carrier mechanism is of such form it effectually precludes any tendency to rotation. The forearms 14 and 15 are secured to the main arm 13 in the same manner as in the case of the section between the machines F and P. But the carriers 16 are quite different. They comprise body blocks 119 bolted securely to the ends of the forearms 14 and 15. These body blocks are vertically recessed from the bottom to receive within the recesses a bushing 120. This bushing is borne downwardly by the pressure of a heavy spiral spring 121 within the recesses and bearing upon its body, but is prevented from leaving the recess by means of the retaining collar 122 screwed or bolted in place on the lower face of the block 119 and engaging its lower end. The bushing 120 is provided with a aperture conically tapering upwardly. Complementally tapered fingers 123 and 124 are borne in this aperture and retained from dropping out of its lower end by a floating collar 125 retained on the upper ends of the fingers by means of a through-bolt 126. Fingers, collar and through-bolt are retained against extensive rotation by the extension of the bolt between two pins 127' the location of the pins being such that the adjacent sides of the fingers 123 and 124 lie in a transverse plane. The fingers are spread apart from each other normally by spiral springs 127—128 housed in registering sockets in the bodies of the fingers. Their lower ends are chamfered or deflected to provide a flaring entrance as at 129 between them.

At the end of the back stroke of shaft S arm 13 of this section of the conveyor, when it moves downwardly in oscillation, projects the fingers 123—124 of the carriers 16 at its opposite ends, respectively, upon opposite sides of the rim flanges 115 of the disc pierced and the disc in the advance intermediate position. The engagement of the body of the discs with the ends of these fingers or the engagement of the transverse pins 130 interconnecting the fingers freely, with the top edge of the rim flange pushes the fingers upwardly together in the tapered aperture of the bushing 120 thereby causing the fingers to draw together and to grasp firmly the rim flange. After a firm grasp, should the downward movement due to a mal-adjustment be further continued, the entire bushing 120 will be moved upwardly in the recessed block 119 against the pressure of the spring 121 without relinquishing the firm grasp of the fingers upon the rim flange. So firmly grasped, the disc pierced and the disc in the advance intermediate position are moved, on the forward stroke, ahead, the one into the drilling position on the axis of the machine D, and the other into the vacated intermediate position, and because of the firm unyielding grasp the disc is not rotated in the slightest degree during this transfer from one position to another, and the holes pierced find themselves in precise registry with the drills of the drilling mechanism, D. This exactitude of angle positioning is carried out between each successive pair of machines operating upon the disc from the piercing machine P through until the assembly machine A is reached. This includes besides the drilling machine, the reaming or coined hole facing machine, the hub flange rough facing machine, and the hub flange finish facing machine. Other machines may be included, if necessary or desirable.

Figure 16:
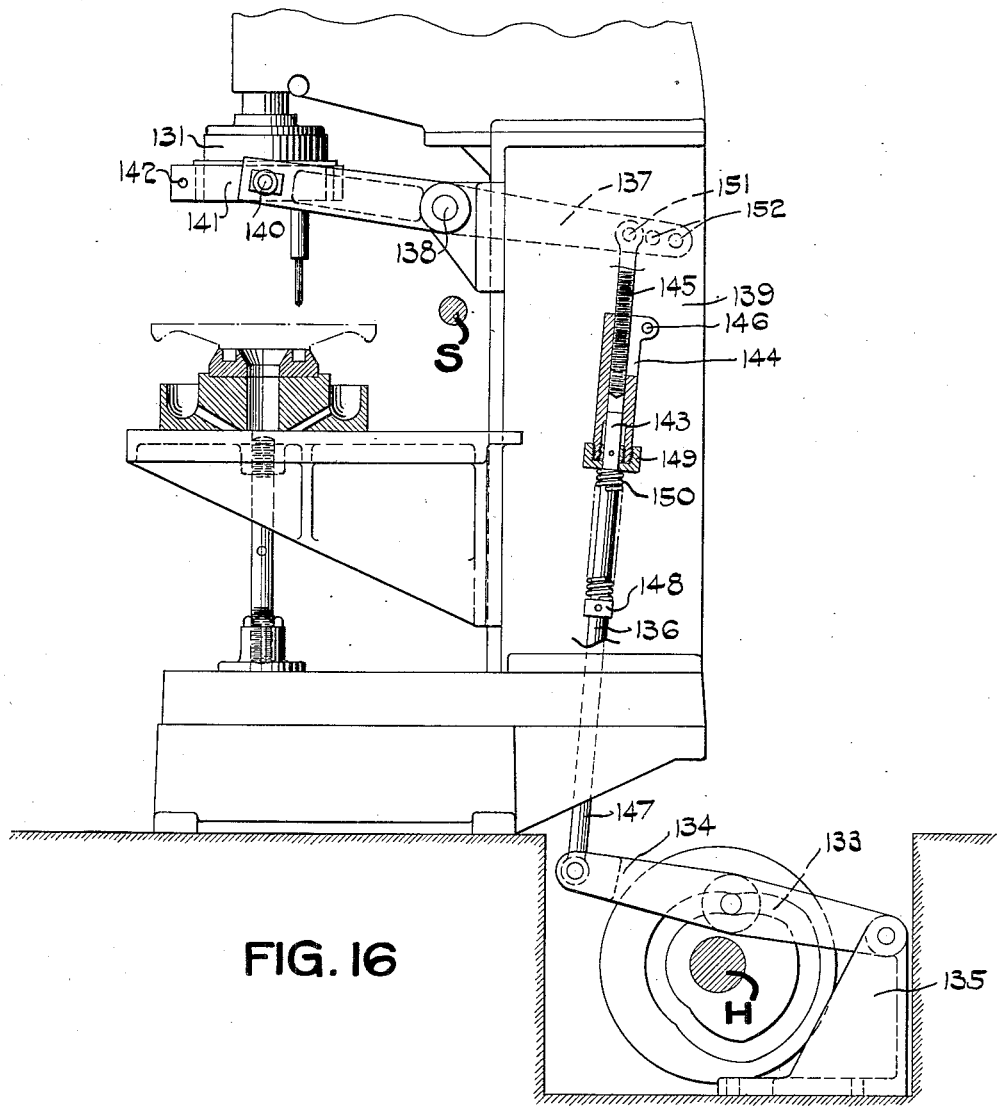
Figure 16 is a transverse elevation of the mechanism used to actuate the several machines used in the machining operations of the processes.

The drilling machine D is, of course, of a character which does not require a tripping mechanism since it is not a one stroke or one revolution machine as are many forms of die presses. The drills are continuously rotated in a head 131. This head is vertically reciprocatable on the axis of the machine as is common in many forms of multiple drilling machines. According to my invention I accomplish this reciprocation automatically from the main control shaft H of the machine by means of the mechanism shown in Fig. 16. This comprises a cam 133 keyed to the shaft H and operating a cam lever 134 pivoted at one end on the fixed support 135 and connecting by its opposite end with a link 136 which in turn connects with the rear end of an oscillating lever 137 pivoted at 138 to the main frame 139 of the machine and engaging through pivotal means 140 at its opposite end with a band 141 clamped in place at 142 around the drilling head 131. The link 136 is made in two sections, the lower of which has an extensible connection with the upper through the telescoping of its end 143 within the adjustable sleeve 144 screw threaded on to the upper section 145 of the link 136 and clamped in adjustable position by means of the bolted upper end 146. Confined on the lower section 147 of link 136 between a fixed collar 148 and a capped end 149 of the sleeve 144 is a spiral spring 150 through which the operating forces are transmitted from the lower link to the upper link and to the drilling head 131 whereby when the drills engage the work they are yieldingly pressed to their work irrespective of the rigidity of the cam 133 and of the resistance which they meet in the material of the disc being operated upon. Beside the adjustment in the screw threaded connection of the sleeve 144 and section 145 of the link this section 145 is adjustable by moving its securing pin 151 to anyone of a plurality of holes 152 in the end of the operating lever 137, whereby the length of throw and time of engagement and the extensions of that engagement may all be adjusted as desired. Such an operating mechanism is provided in connection with each of the machines of the same order as for example, the reaming and facing machines previously mentioned.

Acted on by these machines and conveyed from position to position by conveying mechanism characterized as that disclosed in Figs. 10 and 11 the wheel disc C is finally completed, and ready to be assembled with the rim, having been operated upon by the final facing machine G. When it is in this condition, the next section of the conveyor delivers it to the rim assembling machine A. The characteristics of this section of the conveyor will be more fully appreciated with an understanding of the characteristics of a rim assembling machine. This machine is composed of an assembly press indicated by its frame section 153 and by the ram 154 and base 155 in Figs. 1—B and 2—B. Within its bed 35 is yieldingly held upwardly a lower die body 156 by means of an upwardly acting series of compression springs 157. The rim R, with which the formed disc C is to be assembled, is moved automatically into position upon the lower die member 156. When in axial alignment, the trip mechanism 66 in all respects similar to that shown in connection with the blanking machine B, trips the press to cause the plunger 154 to make a single reciprocation and press the completed body disc C into the positioned rim which completes the assembly. In case of any over throw due to mal-adjustment or obstructions, the lower die body 156 yields against the tension of springs 157 and prevents damage to the machine.

Figure 18:
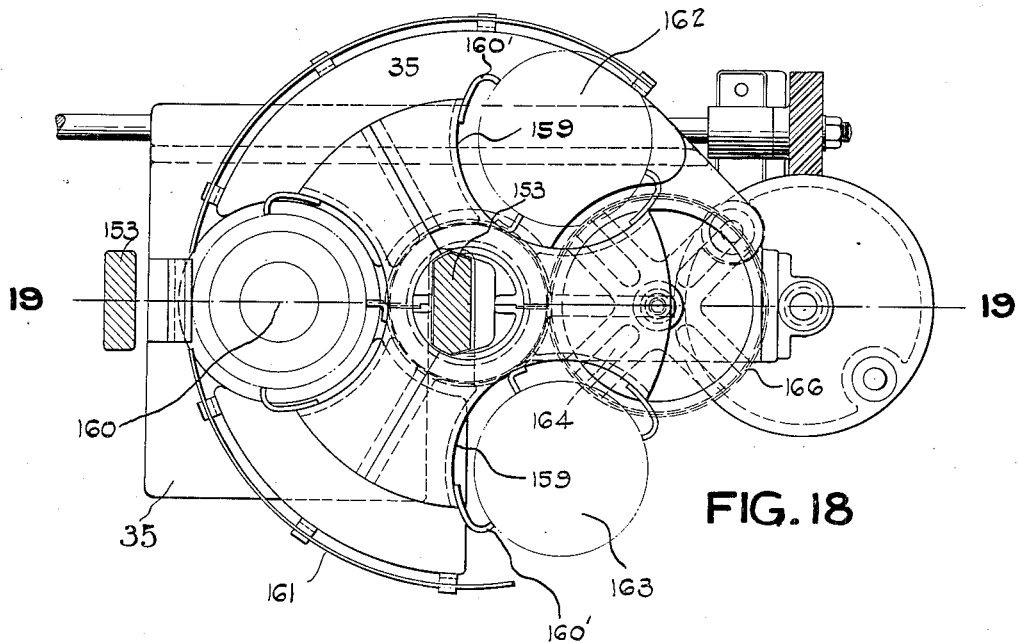
Figure 18 is an enlarged top plan view of the assembly mechanism shown on a small scale at the left end of Figure 1—B, and by means of which the formed wheel discs and the rims are assembled together.
Figure 19:
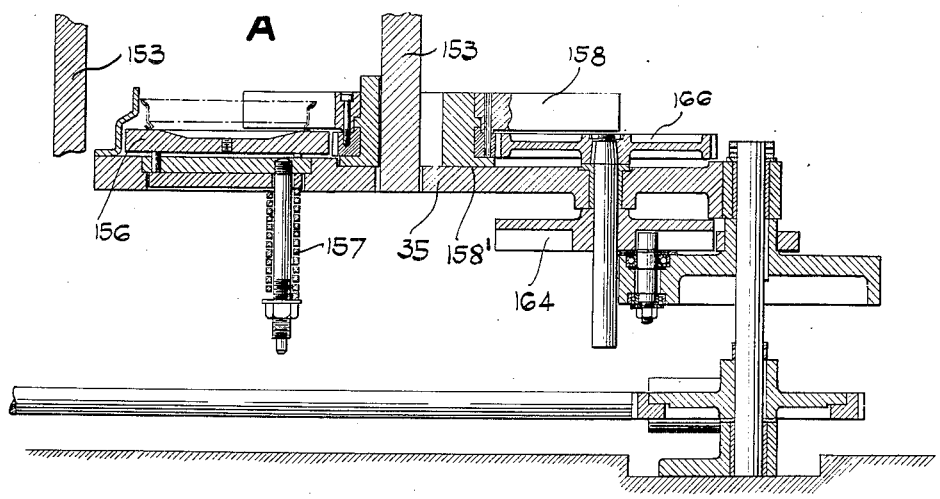
Figure 19 is a transverse sectional elevation substantially on line 19—19 of Figure 18.

The rims are moved to the position of assembly in the present embodiment of the invention by means of a turn-table 158 which surrounds the outer arm 153 of the press and is borne by bearings 158' secured to the bed 35 of the press surrounding this arm. Turn-table 158 is provided with three peripheral rim sockets 159 within which the rim placed on the face of bed 35 is centered by means of three fingers 160' the points of which are in a circle of the diameter of the rim and having a center on a circular path including the center 160 of the press 153 and tangent to the horizontal center line 10 of the apparatus as a whole. The outer fingers 160' are angularly separated more than 180 degrees and are closer to each other than the diameter of the rim whereby they retain between them against radial movement a rim placed between them. Outside of the turn-table is a guard rail 161 further retaining the rims against dislodgment therefrom. Thus, a rim placed in the position marked 162 is moved to the assembly position 160 (Fig. 18), and after assembly is moved to the discharge position 163.

This turn-table is moved through 120 degrees in a step by step motion by means of the Geneva gearing 164 driven from the control shaft H by means of the worm gearing 165 through the various intermediate gears shown and which need not be described here. Suffice it to say that the Geneva gear 164 is properly related to the movement of the turn-table desired through the diameter of the intermediate gear 166 whereby 90 degrees of movement of the Geneva gear is converted into 120 degrees of movement of the turn-table 158. The timing is such that the rims are passed during the rest periods of the machine successively precisely upon the assembly position 160.

At the same time that the rims reach the assembly position 160 the finished discs are projected by the conveyor mechanism shown in Figs 12 to 14 to the same center. In this mechanism the tracks T terminate in end portions 167 hinged on vertical axes to the terminal fixed sections 169. These terminal sections are respectively supported, the inner one from bed 35 by means of the adjustable bracket 170 and the outer from the outer arm 153 of the assembly press by means of the rearwardly extending arm 171 which carries the bracket 172. Abutting walls 173 on the fixed and movable sections 167, 169 respectively, prevent inward movement of the ends 167 to a greater than a predetermined degree. The movable sections 167 are biased inwardly by a spiral spring 174 of adjustable tension connected with the extensions 175 from these sections. The outer extremities of the sections 167 opposite the transverse diameter 177 of the disc C in assembly position have the top and bottom flanges 11 and 102 cut away on arcs 178 concentric with the assembly position 160 so as not to interfere with the movement of the assembly plunger 154 (Fig. 2—B). Moreover the outer ends of the body 112 of the track sections 169 are recessed as at 179 on the region extending in opposite sides of the diameter 177 whereby a secure joint engagement of the disk is effected by each pivoted body 112. This body is, in fact, the only outwardly movable part of the track sections 167, the flanges 11 and 102 being relatively fixed as will be clearly seen by inspecting the track at joints 168. These outer ends of sections 167 are supported upon brackets 180 connected with the upright portions 153 of the machine above the plane of the turn-table 158, being movably joined to the brackets by the pin and slot connections 181.

The arms 13 of the conveyor mechanism of this section are provided with the usual forearms 14 and 15, but the carrier 16 as has been intimated hereinbefore is differently formed. The hindmost one is comprised as shown in Fig. 13 merely of an angle member 182 bolted to the rear face of the forearm 14 and having a lower branch 183 adapted to enter the finished disc behind the rim flange 115 and thereby to draw it from the final operating position in machine G to the final intermediate position adjacent the assembly position 160. The front forearm 15 is, on the other hand, provided with a simple forked carrier very similar in the main to the forked carrier 16 used in connection with the conveyor mechanism in the section adjoining the mechanism of blanking press B. Its two branches 184 have their ends located on a circle of the diameter of the rim flange and having its center on the center line of the apparatus 10 so they engage and center the disc and thrust it along the final section of the track-way T between the inwardly biased sections 167 of the end of the track where it lodges in the recesses 179 and is by the end walls of the recesses centered in the assembly press at 160. The abutting walls 173 on the fixed and movable sections are so spaced apart as to permit the pivoted sections 167 to engage the finished disc in a firm centering grasp. At this juncture the trip mechanism 66—69 is operated, the rim having previously been moved to the assembly position, the ram 154 comes down and pushes the finished disc into the rim. Should there be any slight mis-alignment, the pivoted portions 167 and their yielding grasp with the disc C at the final assembly position permit the disc C immediately to line itself up under the ram 154 and thereby to be pressed with certainty into the waiting rim. The ram then rises, the turntable is rotated through 120 degrees and the completed wheel is taken out or else automatically discharged therefrom.

The movement of the carriers 16 on each arm 13 of the conveying mechanism, it will be observed, is a movement on a closed substantially rectangular path, since the reciprocating movement of the shaft S moves the carriers on a long stroke forward, then the oscillating movement lifts them upward in a substantially vertical plane, then the return reciprocating stroke moves them on a long stroke rearward and finally the ensuing oscillation downwardly in a substantially vertical plane completes the rectangular path. By virtue of the vertical movements at the opposite ends of the path the carriers are moved vertically into and out of engagement with the associated discs without in any way disturbing the centered relations of the discs to the various operating positions into which they have been moved.

I am aware that the embodiment of my invention, which I have described and illustrated in this specification, may be changed considerably without departing from the spirit of my invention and therefore I am not to be restricted to the particular embodiment illustrated, but claim my invention broadly as indicated by the appended claims.

What I claim is:—

1. The method of fabricating vehicle wheels having in their completed form central formations requiring presentation to operations in a definite angular relation, which consists in preforming wheel body parts to form thereon a surface or surfaces concentric with the ultimate center of the wheel, and in conveying said wheel parts from operation to operation by means engaging said surface or surfaces, the while positively holding said wheel parts by engagement into said surface or surfaces against angular movement with respect to said conveying means.

2. The method of fabricating wheels which consists in preforming wheel body parts to provide thereon a peripheral flange concentric with the ultimate center of the wheel and to provide central formations requiring presentation to subsequent operations in a definite angular relation and in conveying said wheel parts from operation to operation by means engaging said flange and preventing rotation of the wheel part with respect to said conveying means.

3. Apparatus for fabricating wheels comprising a plurality of machines adapted to operate upon a wheel part successively and including a pre-shaping machine to provide a surface or surfaces thereon arranged substantially at right angles to the plane of said wheel part, and conveying mechanism for moving said wheel parts from machine to machine and comprising means engaging said surface or surfaces and holding the same against angular movement with respect to said means.

4. Apparatus for fabricating wheels comprising a plurality of machines adapted to operate upon a wheel part successively including machines to pre-shape the wheel part to form a surface thereon concentric with the ultimate center of the wheel and to provide central formations requiring presentation to subsequent machines in a definite angular relation, and conveying mechanism for moving said wheel parts from machine to machine and comprising means engaging the wheel parts on said preformed concentric surfaces and holding the same against angular movement with respect to said means.

5. Apparatus for fabricating wheels comprising a plurality of machines adapted to operate upon a wheel part successively including machines to pre-shape the wheel part to form a peripheral flange thereon concentric with the ultimate center of the wheel and to provide central formations requiring presentation to subsequent machines in a definite angular relation, and conveying mechanism for moving said wheel parts from machine to machine and comprising means engaging the wheel parts on said preformed peripheral flanges and cooperation with said flanges to hold the wheel part against angular movement with respect to said means.

6. Apparatus for fabricating wheels comprising a plurality of machines adapted to operate upon a wheel part successively and including a preshaping machine to provide a surface or surfaces thereon arranged substantially at right angles to the plane of said wheel part, and conveying mechanism for moving said wheel parts from machine to machine and comprising means for engaging said surface or surfaces and holding the same against angular movement with respect to said means, as well as initially centering the wheel parts on the machines.

7. Apparatus for fabricating wheels comprising a plurality of operatively related machines adapted to operate upon the wheel parts sequentially and including an assembly press, conveying devices for bringing the wheel bodies and wheel rims from different paths at least one of which parts extends through said plurality of related machines, under the assembly press, and means for relatively yieldingly supporting a wheel body and rim in axial alignment when moved under the assembly press, to permit slight relative radial movement of said parts to accurately line them up with each other and with the plunger of the assembly press.

8. Apparatus for fabricating wheels, comprising a plurality of operatively related machines, each adapted to perform successively one of several manufacturing operations upon a wheel part, arranged in the sequential order of the operations, and a conveyor mechanism for moving the wheel parts being operated on along a predetermined path through the machines, said conveyor mechanism comprising devices connected for operative engagement substantially simultaneously with a plurality of said wheel parts and movable vertically to bring said devices into operative engagement with said wheel parts and horizontally to simultaneously advance said wheel parts along said path, and means for commonly actuating said devices.

9. Apparatus for fabricating wheel parts involving a plurality of operatively related successive operations, a plurality of machines arranged to operate on the wheel parts successively, and conveyor mechanism for moving the wheel parts from machine to machine and into operative relation to said machines, said conveyor mechanism comprising a plurality of carrier arms connected for substantially simultaneous engagement with a plurality of wheel parts and movable in two planes, movement in one plane being for the purpose of operatively engaging or disengaging a wheel part, and movement in the other plane being for the purpose of advancing a wheel part, and means for commonly actuating said carrier arms.

10. Apparatus for fabricating wheel parts involving a plurality of operatively related successive operations, a plurality of machines arranged to operate on the wheel parts successively, and conveyor mechanism for moving the wheel parts from machine to machine and into operative relation to said machines, said mechanism comprising, as a main element thereof, a shaft extending along said machines and being mounted for longitudinally reciprocating and oscillating movements with respect to its axis and means for actuting said shaft.

11. Apparatus for fabricating wheel parts comprising a plurality of operatively related machines adapted to operate successively on said wheel parts, and conveyor mechanism for moving the wheel parts from machine to machine and into operative relation to said machines, said mechanism comprising a longitudinally reciprocating and oscillating shaft provided with work engaging devices brought into and out of engagement with the work by the oscillation of the shaft, and imparting forward feeding movement to the work to move it from machine to machine in the longitudinal movement of said shaft in one direction, and means for reciprocating and oscillating said shaft.

12. Apparatus for fabricating wheel parts involving a plurality of successive operations, a plurality of operatively related machines including closed side presses, arranged to operate on the wheel parts successively, and conveyor mechanism for transferring the wheel parts from machine to machine comprising a longitudinally reciprocating and axially oscillating member passing between the closed sides of said presses and arranged to intermittently move the wheel parts, and means for actuating said member.

13. Apparatus for fabricating wheels involving a plurality of sequential operations comprising a plurality of spaced machines, including closed side presses, arranged to operate upon wheel parts successively, means for transferring the work parts from machine to machine comprising a guide way connecting them and a reciprocating conveyor or shaft passing between the closed sides of the presses and arranged to intermittently move the wheel parts along the guide way.

14. Apparatus for fabricating wheel parts comprising a plurality of machines adapted to operate upon the parts to be fabricated successively, and work conveying mechanism adapted for reciprocatory movement and having a plurality of work carriers vertically movable to operatively engage the work.

15. Apparatus for fabricating wheel parts comprising a plurality of mechanisms for performing sequential operations upon a work part, and a conveyor mechanism including a plurality of arms disposed between adjacent pairs of operation performing mechanisms, each of said arms carrying a pair of work engaging devices, and each device of a pair being adapted to engage adjacent portions of successive work parts.

16. Apparatus for fabricating wheel parts involving a plurality of sequential operations, comprising conveying mechanism for moving the wheel parts from operation to operation including opposed clamping fingers, means for moving said fingers to engage the work, and means operative to cause said fingers to clamp the work by virtue of their engagement therewith.

17. Apparatus for fabricating circular wheel parts involving a plurality of sequential operations, comprising conveying mechanism for moving the wheel parts from operation to operation including a work carrier adapted to engage a peripheral portion of the work, said carrier comprising opposed clamping fingers extending at right angles to the plane of the work when in work engaging position, and means for moving said carrier in a direction substantially at right angles to the direction in which said clamping fingers extend.

18. Apparatus for fabricating wheel parts, comprising a reciprocating and oscillating conveyor member having a plurality of laterally extending projections the free ends of which are adapted to engage and move a plurality of work parts simultaneously, said ends being provided with clamping devices to engage opposed surfaces of the work parts and positively hold said parts against angular movement with respect to the conveying projections while being conveyed.

19. Apparatus for fabricating wheel parts having a peripheral laterally extending flange and involving a plurality of sequential operations, comprising a conveying mechanism to move the work parts from operation to operation embodying clamping fingers to engage over said flange, said clamping fingers being yieldingly held against endwise movement and positively against substantial rotary movement.

20. Apparatus for fabricating wheel parts involving a plurality of sequential operations including means for transferring the work parts from operation to operation embodying a guide way comprising opposed channel shaped guide rails, one side wall of the channel forming said rails being yieldingly mounted to permit outward movement whereby to effectively guide the work parts regardless of small dimensional differences in said parts and means for positively moving the work parts along said guideway.

21. Apparatus for fabricating wheel parts involving a plurality of sequential operations, comprising means for transferring the work parts from operation to operation embodying a pair of channel-shaped guide rails, one side wall of at least one of said rails being yieldingly mounted to permit bodily outward movement and longitudinally serrated on its inner surface, and means for positively moving the work along said guide rails.

22. Apparatus for fabricating wheel parts involving a plurality of sequential operations comprising transfer means for said wheel parts embodying a pair of opposed guide rails terminating in flexible end portions biased inwardly toward each other, whereby a wheel part is yieldingly gripped between said end portions while it is permitted slight bodily movement transversely to said guide rails in the plane thereof.

23. In an apparatus for fabricating wheel parts involving a plurality of sequential operations including an assembly operation, transfer means for the wheel parts embodying opposed guide rails of channel section, the walls of said channels being cut away at the assembly position to permit movement of a wheel part bodily in a direction transversely of the guide rails and substantially normal to the plane of the rails.

24. Apparatus for fabricating wheels comprising a wheel body fabricating line of machines, an assembly machine, and conveyor mechanism for positively moving a wheel body being fabricated through said line and beyond to the assembly machine and into operative relation, successively, with each of said machines, a turn-table associated with said assembly machine, for bringing a fabricated wheel rim with its center in alignment with the center of fabricated wheel body moved along said wheel body line to the assembly position, and means whereby the rotation of the turntable and the conveyor mechanism for the wheel bodies are so synchronized as to bring a wheel body and rim substantially simultaneously to the assembly position.

25. Apparatus for fabricating wheels involving a plurality of successive operations, a conveyor shaft for moving the work parts from operation to operation, means for oscillating said shaft comprising a plurality of arms projecting from the shaft to rotate therewith and a quill member associated with each of said arms and journalled on the shaft and having projecting portions extending from the journals and provided with means engaging the arms to prevent relative rotation of the arms and quills, but permitting relative endwise movement of said parts.

26. Apparatus for fabricating wheels, comprising a plurality of spaced machines, each adapted to perform one of several manufacturing operations upon a work part, a common control mechanism for causing each of said machines to complete an operative cycle upon the work part located in its sphere of action, and conveyor mechanism synchronized with said control mechanism for bringing work parts successively within the sphere of action of the machines in the interval between each operative cycle of the machines.

27. Apparatus for fabricating wheels comprising a plurality of spaced machines, each adapted to perform one of several manufacturing operations upon a work part, operations controlling mechanisms for the several machines, said operations controlling mechanisms being connected by a longitudinally extending cam shaft carrying cams cooperating with the operations controlling mechanisms of the several machines.

28. Apparatus for fabricating wheels comprising a plurality of spaced machines each adapted to perform one of several manufacturing operations, one of said machines constituting a master machine, conveyor mechanism for moving the work parts from machine to machine, and operations controlling mechanism for controlling the operations of all the machines except the master machine, and means whereby the conveyor mechanism and the operations controlling mechanism are driven from the master machine.

29. Apparatus for fabricating wheels involving a plurality of sequential operations comprising a plurality of spaced machines arranged to operate upon the wheel part successively, a guide-way extending from machine to machine, conveyor mechanism actuatable intermittently to move a series of wheel parts along said guide-way to center them successively, on the machines, and a common control for said machines and means whereby the movements of the control and the conveyor are properly synchronized.

30. Apparatus for fabricating wheels comprising a plurality of machines for successively operating upon a wheel part, said wheel part having a portion flanked by surfaces extending substantially at right angles to the plane of the wheel part, means for conveying said wheel parts from machine to machine by engagement with said portion, said means comprising a vertically movable arm carrying clamping jaws and means for moving said arm to force the jaws down over said portion to clamp it between them by engagement with said flanking surfaces, said jaws being movable independently of the movement of the arm in such engagement, and means for causing a firmer clamping action of the jaws in such movement.

31. Apparatus for fabricating wheels comprising a plurality of operatively related machines adapted to operate upon a wheel part successively and including a pre-shaping machine to provide a surface or surfaces thereon arranged substantially at right angles to the plane of the wheel part, and conveying mechanism for moving said wheel parts from machine to machine and comprising means engaging said surface or surfaces to transmit to said wheel parts the conveying force and also to control the angular position of said wheel part by engagement with said surface or surfaces.

32. Apparatus for fabricating wheels comprising an assembly press, means for placing a rim in said press, a wheel body guideway operatively connected with said press, said wheel body guideway including a pair of yieldingly and pivotally mounted guides adapted to engage the peripheral edge of a wheel body to hold the same in axial alignment with a rim in the press, and means for feeding wheel bodies along said guideway with a step by step motion.

33. Apparatus for fabricating wheels comprising an assembly press, means for placing a rim in said press, a wheel body guideway operatively connected with said press, said wheel body guideway including a pair of yieldingly and pivotally mounted guides adapted to engage the peripheral edge of a wheel body to hold the same in axial alignment with a rim in the press, a wheel body feed device adapted to be positioned between adjacent wheel bodies and engage each of said wheel bodies, and means for moving said wheel body feed device to feed one of said wheel bodies to the press and position the other of said wheel bodies in operative position to be fed to the press.

34. Apparatus for fabricating wheels comprising an assembly press, means for placing a rim in said press, a wheel body guideway operatively connected with said press, said wheel body guideway including a pair of yieldingly and pivotally mounted guides adapted to engage the peripheral edge of a wheel body to hold the same in axial alignment with a rim in the press, a conveyor shaft disposed in operative relation to said guideway, an arm carried by said shaft and having oppositely disposed wheel body engaging projections adapted to engage a pair of adjacent wheel bodies, and means for moving said shaft thereby to actuate said arm and wheel body engaging projections to position one of said wheel bodies in the press, and the other in the position formerly occupied by the first-mentioned wheel body.

35. Apparatus for fabricating wheels comprising an assembly press, means for placing a rim in said press, a wheel body guideway operatively connected with said press, said wheel body guideway including a pair of substantially horizontally disposed guides having end portions, said end portions being pivotally mounted adjacent one end, and yieldingly connected together adjacent their opposite ends, a wheel body feed mechanism disposed in operative relation to said guides, and means for operating said feed mechanism to feed the wheel bodies along said guides with a step by step movement.

36. Apparatus for fabricating wheels comprising an assembly press, means for placing a rim in said press, a wheel body guideway disposed in operative relation to said press, said wheel body guideway including a pair of spaced guides having portions mounted for movement toward and from each other and adapted to engage and retain a wheel body in alignment with a rim in said press, means yieldingly urging said portions toward each other to frictionally engage a wheel body, and means for feeding wheel bodies along said guideway.

37. The method of fabricating vehicle wheels involving a plurality of sequential operations, which consists in preforming the separate wheel parts to provide thereon a surface or surfaces extending at substantially right angles to the plane of said parts, and in thereafter automatically conveying the wheel parts from operation to operation and positively controlling their angular position with respect to rotation about their own axes by the engagement of the conveying means with said surface or surfaces.

In testimony whereof I hereunto affix my signature.

JAMES WILLIAM HUGHES.